United States Patent
Gschwind

(10) Patent No.: US 10,013,258 B2
(45) Date of Patent: *Jul. 3, 2018

(54) SINGLE INSTRUCTION ARRAY INDEX COMPUTATION

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/500,171

(22) Filed: Sep. 29, 2014

(65) Prior Publication Data

US 2016/0092241 A1    Mar. 31, 2016

(51) Int. Cl.
| | |
|---|---|
| G06F 15/76 | (2006.01) |
| G06F 9/315 | (2018.01) |
| G06F 9/355 | (2018.01) |
| G06F 9/38 | (2018.01) |
| G06F 9/30 | (2018.01) |
| G06F 12/02 | (2006.01) |
| G06F 15/80 | (2006.01) |

(52) U.S. Cl.
CPC ........ *G06F 9/3887* (2013.01); *G06F 9/30145* (2013.01); *G06F 9/30032* (2013.01); *G06F 9/30134* (2013.01); *G06F 9/355* (2013.01); *G06F 9/3552* (2013.01); *G06F 9/3555* (2013.01); *G06F 9/3557* (2013.01); *G06F 12/0223* (2013.01); *G06F 15/8007* (2013.01)

(58) Field of Classification Search
CPC .... G06F 9/30145; G06F 9/3887; G06F 9/355; G06F 9/3552; G06F 9/3555; G06F 9/3557; G06F 12/0223; G06F 12/0284; G06F 12/10; G06F 9/30032; G06F 9/30134; G06F 15/8007
USPC .............. 712/22, 27; 711/217, 219; 708/209
See application file for complete search history.

(56) References Cited

U.S. PATENT DOCUMENTS

| | | | |
|---|---|---|---|
| 5,940,312 A | * | 8/1999 | Hansen ..................... G06F 5/01 708/209 |
| 6,457,115 B1 | | 9/2002 | McGrath |
| 6,725,366 B1 | | 4/2004 | Swanberg |

(Continued)

OTHER PUBLICATIONS

Kulukuru, V.; "z/OS 64-bit C.C++ and Java Programming Environment"; IBM Corporation, http://www.ibm.com/redbooks/redp-9110-00 . . . 2004.

Osuna, A. et al.; "A Through Introduction to 64-Bit Aggregates"; IBM Corporation, http:/www.ibm.com/redbooks/redp-4759-00 . . . 2011.

(Continued)

*Primary Examiner* — Daniel H Pan
(74) *Attorney, Agent, or Firm* — Cantor Colburn LLP; Steven Chiu

(57) ABSTRACT

Embodiments are directed to a method of adjusting an index, wherein the index identifies a location of an element within an array. The method includes executing, by a computer, a single instruction that adjusts a first parameter of the index to match a parameter of an array address. The single instruction further adjusts a second parameter of the index to match a parameter of the array element. The adjustment of the first parameter includes a sign extension.

9 Claims, 4 Drawing Sheets

(56) References Cited

U.S. PATENT DOCUMENTS

| | | | |
|---|---|---|---|
| 7,401,202 B1* | 7/2008 | Click, Jr. | G06F 9/3001 711/2 |
| 9,658,821 B2* | 5/2017 | Gschwind | G06F 5/01 |
| 2003/0131030 A1* | 7/2003 | Sebot | G06F 9/3013 708/209 |
| 2004/0003209 A1* | 1/2004 | Mitsuishi | G06F 9/30018 712/225 |
| 2006/0271763 A1* | 11/2006 | Pedersen | G06F 9/30018 711/220 |
| 2016/0092166 A1* | 3/2016 | Gschwind | G06F 5/01 708/209 |
| 2016/0092228 A1* | 3/2016 | Gschwind | G06F 5/01 711/110 |

OTHER PUBLICATIONS

Watts, D. et al.; "Introducing Windows Server x64 on IBM eserver xSeries Servers"; IBM Corporation, http://www.ibm.com/redbooks/redp-3982-00 . . . Jun. 2005.

Appendix P, List of IBM Patents or Patent Applications Treated as Related dated Oct. 6, 2014, 2 pages.

U.S. Appl. No. 14/500,251, filed Sep. 29, 2014, Entitled: Single Instruction Array Index Computation, First Named Inventor: Michael K. Gschwind.

List of IBM Patents or Patent Applications Treated as Related—Date Filed: Sep. 29, 2014; 2 pages.

Michael K. Gschwind, "Single Operation Array Index Computation," U.S. Appl. No. 15/807,642, filed Nov. 9, 2017.

List of IBM Patents or Patent Applications Treated as Related; Date Filed: Sep. 29, 2014, pp. 1-2.

\* cited by examiner

INDEX WORD ALGEBRAIC   D-FORM/D5 FORM indexwa    RT,RA,SI

| opcode | RT | RA | UI |
|---|---|---|---|
| 0 | 6 | 11 | 16        31 |

← 300 if (popcnt (UI) /= 1)
  indicate illegal instruction

RT ← extsw (RA) * UI
RT ← ( RA$_{32}^{32}$ || RA ) * UI

FIG. 3

INDEX WORD ALGEBRAIC   D-FORM/D5 FORM indexwa    RT,RA,SI

| opcode | RT | RA | UI |
|---|---|---|---|
| 0 | 6 | 11 | 16        31 |

← 400

RT ← extsw (RA) << UI$_{2:0}$
or:
RT ← extsw (RA) << shift
or:
RT ← ( RA$_{32}^{32}$ || RA ) << shift

FIG. 4

INDEX WORD UNSIGNED   D-FORM/D5 FORM indexwz    RT,RA,SI

| opcode | RT | RA | UI |
|---|---|---|---|
| 0 | 6 | 11 | 16        31 |

← 500 if (popcnt (UI) /= 1)
  indicate illegal instruction

SINGLE INSTRUCTION ARRAY INDEX COMPUTATION

BACKGROUND

The present disclosure relates in general to array index computations, and more specifically to reducing the overhead required to perform array index computations.

The simplest type of data structure in computer architecture is a linear array, which consists of a collection of elements (or values, or variables) each identified by at least one array index. A programmer locates and accesses a particular array element by knowing an address that identifies where the start of the particular array is located in memory, along with the index, which identifies how far from the array start address the element is actually located. An array is stored so that the position of each element can be computed from its index tuple by a mathematical formula. For example, an array of 10 32-bit integer variables, with indices 0 through 9, may be stored as 10 words at memory addresses 2000, 2004, 2008, . . . 2036, so that the element with index i has the address 2000+4×i. This operation is known generally as an array index computation.

For a variety of reasons, 64-bit servers must be able to execute 32-bit applications. This means that for a 32-bit application running on a 64-bit server, the array memory locations are 64-bits while the indices are 32-bits. The disparity between data types and address widths typically requires multiple step adjustments to a 32-bit application-generated index in order to perform an array index computation on a 64-bit server. Implementing the multiple adjustments to 32-bit indices typically requires multiple additional code instructions, thereby increasing programming overhead and potentially having a negative impact on application performance, particularly for large data sets.

SUMMARY

Embodiments are directed to a computer program product for adjusting an index, wherein the index identifies a location of an element within an array. The computer program includes a computer readable storage medium having program instructions embodied therewith, wherein the computer readable storage medium is not a transitory signal per se. The program instructions are readable by a processor circuit to cause the processor circuit to perform a method. The program instructions include a single instruction that adjusts a first parameter of the index to match a parameter of an array address. The single instruction further adjusts a second parameter of the index to match a parameter of the array element, and the adjustment of the first parameter includes a sign extension.

Embodiments are further directed to a method of adjusting an index, wherein the index identifies a location of an element within an array. The method includes executing, by a computer, a single instruction that adjusts a first parameter of the index to match a parameter of an array address. The single instruction further adjusts a second parameter of the index to match a parameter of the array element, and the adjustment of the first parameter includes a sign extension.

Embodiments are further directed to a method for computing and writing a signed array index. The method includes obtaining, by a computer system, an array index of a first data type, wherein the array index includes a first signed register operand. The method executes, by the computer system, a first single instruction that performs a first adjustment to a size of the first signed register operand, wherein the first adjustment corresponds to a size of a second data type, the size of the second data type corresponds to a data type size of an address in the computer system and the size of the second data type is different from the size of the first signed register operand. The first single instruction performs a second adjustment to an immediate operand and uses the immediate operand as an offset for obtaining an operand of a third data type size. The computer system writes a result of the first adjustment and the second adjustment to a result operand register.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 3 depicts an example of instruction encoding in single instruction formats for performing two adjustments in accordance with one or more embodiments;

FIG. 4 depicts another example of instruction encoding in single instruction formats for performing two adjustments in accordance with one or more embodiments;

FIG. 5 depicts another example of instruction encoding in single instruction formats for performing two adjustments in accordance with one or more embodiments;

Figure 1:
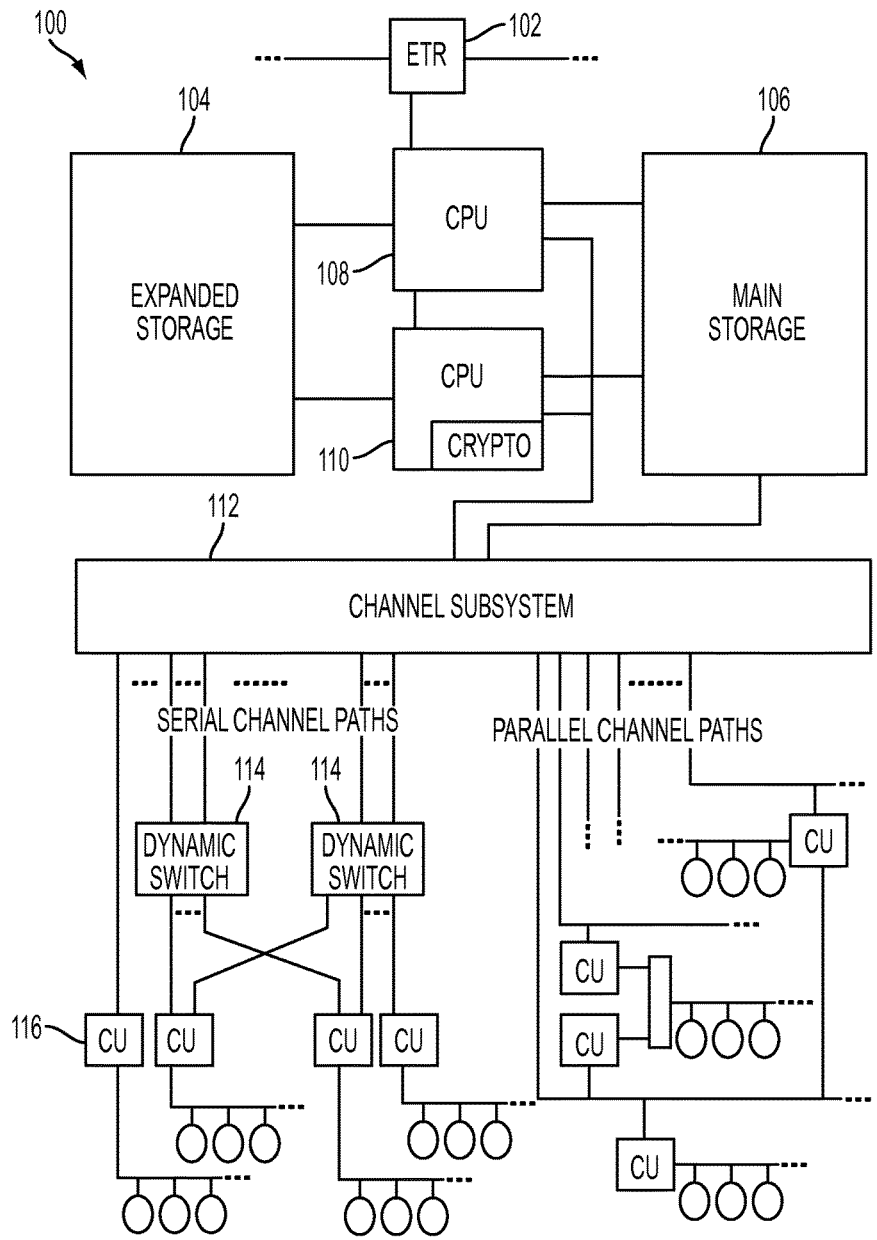
FIG. 1 depicts a logical structure of a z/Architecture system capable of implementing one or more embodiments of the present disclosure.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes references to various computer programming methodologies (e.g., C, C++, C#, Java, etc.) and instruction set architectures (e.g., z Architecture, Power Architectures, etc.), implementation of the teachings recited herein are not limited to any particular computing environment. Rather, embodiments of the present invention are capable of being implemented in conjunction with any other type of computing environment now known or later developed.

The C programming language is a general purpose, procedural, imperative computer programming language developed in the early 1970s for the UNIX operating system. C is a complied language, which means that it must be run through a C compiler to turn the C program into an executable program that the computer can run. A C program, whatever its size, consists of functions and variables. A function contains statements that specify the computing operations to be done, and variables store values used during the computation. In the C programming language, a data type refers to an extensive system used for declaring variables or functions of different types. A variable's data type determines how much space it occupies in storage and how the bit pattern stored is interpreted. Integer data types in the C programming language include char, unsigned char, signed char, int, unsigned int, short, unsigned short, long and unsigned long.

The simplest type of data structure in computer architecture is a linear array, which consists of a collection of elements (or values, or variables) each identified by at least one array index. The array index is usually provided by a variable of integer data type (e.g., the data type "int" in the C and C++ programming languages), which is assigned integer quantities. A programmer locates and accesses a particular array element by knowing an address that identifies where the start of the element's array is located in memory, along with an integer (i.e., index) that identifies how far from the array start address the element is actually located. An array is stored so that the position of each array element can be computed from its index tuple by a mathematical formula. For example, an array of 10 32-bit integer variables, with indices 0 through 9, may be stored as 10 words at memory addresses 2000, 2004, 2008, . . . 2036, so that the element with index i has the address 2000+4×i. This operation is known generally as an array index computation.

Computer system manufacturers continually strive for faster, more powerful processors in order to supply systems for demanding applications. Processors, in turn, have evolved from simple 8-bit microprocessors all the way to current 64-bit processors. The addressable memory of these processors has likewise grown exponentially. 32-bit processors could access $2^{32}$ bytes of virtual memory (4 gigabytes). Meanwhile, 64-bit processors can access $2^{64}$ bytes of virtual memory.

While increasing processor power and addressable memory space is advantageous, a large number of programs have already been written to operate in 32-bit environments. Accordingly, 64-bit processors are more than sufficient to run 32-bit programs. Additionally, in a 64-bit architecture, a 32-bit address only uses the low 32 bits of the possible 64 bits. Therefore, the high order bits, including the bits determining the memory region, will be equal to zero (0). As a result, 32-bit programs operating in a 64-bit processor generally conserve memory space.

With specific reference to array indexing in 64-bit servers, the index integer is typically still 32-bits even though the array address size is typically 64-bits. Thus, many applications have an assumption built in that the array address size is 64-bits and the array index integer variable is 32-bits. The disparity between data types and address widths typically requires multiple adjustments to a 32-bit application-generated index in order to perform an array index computation on a 64-bit server. In other words, the array index computation that computes the address of the element that the programmer is actually interested in must combine a 32-bit value with a 64-bit value. This requires two adjustments to the 32-bit value.

First, the 32-bit value must be "sign extended" to 64-bits so that it can be combined with the 64-bit address. Sign extension is the operation, in computer arithmetic, of increasing the number of bits of a binary number while preserving the number's sign (positive/negative) and value. This is typically done by appending digits to the most significant side of the number, following a procedure dependent on the particular signed number representation used. For example, if six bits are used to represent the number "001010" (decimal positive 10) and the sign extend operation increases the word length to 16 bits, the new representation is simply "0000 000000001010". Thus, both the value and the fact that the value was positive are maintained.

Second, the index also must be adjusted for the size of the data to be accessed in order for the computer to understand the actual distance in bytes that the index specifies. For example, if each data item is 1-byte long, then element 10 is 10-bytes away from the start address where element 0 is located. If each data item is 8-bytes long, then element 10 is 80-bytes away from the start address. In other words, knowing that a desired location is 3 blocks away from a start location X does not provide the level of precision one would need to know exactly how far to walk. One would need to know the exact length of each block to know exactly how far to walk. If each block is 500 feet long, the desired location is actually 1500 feet (i.e., 3 blocks×500 feet) from start location X.

In contemporary programs and/or compilers, the above-described two adjustments require that multiple instructions are performed. The following instruction sequence includes known examples of the two instructions required to perform an array index computation in the C/C++ programming language for the access a[r2+1]. The sign extend instruction adjusts the 32-bit integer to become a 64-bit value, and the shift instruction adjusts the index in accordance with the element size.

ahi % r2, 1 lar1 % r1, a
lgfr % r2, % r2 (a sign extend instruction)
sllg % r2, % r2, 3 (a shift instruction)
ld % f0, 0(% r2, % r1) (a load instruction)

More specifically, for the sign extend instruction, "lgfr" is the z/Architecture instruction for sign extending a 32-bit register into a 64-bit register. For the shift instruction, "sllg" is the z/Architecture instruction that shifts left, thereby shifting left by 3, i.e., the shifting left of a 64-bit register by 3 bits (or multiplying by 8). Implementing an array index computation using multiple instructions of the type shown above increases programming overhead, which has a negative overall impact on application performance, particularly for large data sets. Details of the z/Architecture system may be obtained from its architectural specification, which is available on the World Wide Web at www.ibm.com. The entire disclosure of this manual is incorporated herein by reference in its entirety.

The present disclosure include systems and methodologies for providing a single instruction that performs, at substantially the same time, both adjustments needed in order to complete an array index computation. The disclosed single instruction accesses a 32-bit integer that is an index, sign extends the index to 64-bits, then adjusts the sign extended index by the size of the base element, which is provided as an offset that is used to access an array. In one or more embodiments, the adjustment to the sign extended index is either a multiplication or a shift of the sign extended index by a shift factor (or count) that corresponds to a size of the underlying element. More particularly, in one or more embodiments, the shift factor is expressed as an address that results from adding an immediate value and a register value together. However, the result from adding the two values together value is not in fact used to address anything but just to provide a data type size to use in the shift function. This approach takes advantage of how historically mainframes have implemented shifts because it enables the shift-immediate, shift-register and shift-register plus immediate functions to be encoded in a single instruction. Although disclosed in connection with 32-bit indices and 64-bit processor memory locations, the teachings of the present disclosure would apply to any differential between a parameter of the index and a parameter of the array memory. Implementing an array index computation using the disclosed single instruction decreases programming overhead, which has a positive overall impact on application performance, particularly for large data sets. Thus, the operation of the overall computer system may be improved.

In computer science, a logical shift is a bitwise operation that shifts all the bits of its operand. The two base variants are the logical left shift and the logical right shift. This is further modulated by the number of bit positions a given value shall be shifted, for example "shift left by 1" or a "shift right by n". Unlike an arithmetic shift, a logical shift does not preserve a number's sign bit or distinguish a number's exponent from its mantissa. Every bit in the operand is simply moved a given number of bit positions, and the vacant bit-positions are filled in, usually with zeros. For example, a logical shift left by 1 could be represented as follows: (11001011<<1)=10010110. A logical shift left by 3 could be represented as follows: (11001011<<3)=01011000.

A logical shift is often used when its operand is being treated as a sequence of bits rather than as a number. Logical shifts can be useful as efficient ways of performing multiplication or division of unsigned integers by powers of two. Shifting left by n bits on a signed or unsigned binary number has the effect of multiplying it by $2^n$. Shifting right by n bits on an unsigned binary number has the effect of dividing it by $2^n$. Because arithmetic right shift differs from logical right shift, many languages have different operators for them. For example, in C, C++ the right shift operator is ">>".

The present disclosure may be implemented in a reduced instruction set computing (RISC) environment, or in a complex instruction set computing environment (CISC). The computing environment can include either a system z/Architecture ISA (instruction set architecture) or a Power ISA. A Power ISA architectural specification is available on the World Wide Web at www.power.org. The entire disclosure of this architectural specification is incorporated by reference herein in its entirety. To access an array element specified by an index, these instruction formats and ISAs perform the same underlying function, which is to take the index, sign extend it, then either multiply or shift it by the size of the underlying element. As noted above, the reason the second adjustment can be either a multiplication or a shift is because in integer arithmetic with binary number representations, multiplying by 2 is the same as shifting the value by one bit. So it is a design choice to either multiply, for example by 4, or shift the value by 2 bits. The shift and the multiplication in this case are the same operation. It should be noted, however, that if a shift method is chosen, all the powers of 2 can be supported in terms of the possible element sizes because each shift of 1 bit is a multiplication of 2. However, this design choice would limit the possible sizes that may be supported to powers of 2. Because powers of 2 are the most common sizes of data types in computers, in most environments this is an acceptable limitation.

Turning now to FIG. 1, there is shown a logical structure of a z/Architecture system 100 capable of implementing one or more embodiments of the present disclosure. As shown, system 100 includes an external time reference (ETR) 102, an expanded storage 104, a main storage 106, a first central processing unit (CPU) 108, a second CPU 110, a channel subsystem 112, dynamic switches 114 and control units (CUs) 116 (for ease of illustration only one reference number for the CUs is shown), configured and arranged as shown. Specifically, expanded storage 104 and main storage 106 include array structures that are located and accessed according to an array index computation. Additional details of the overall operation of system 100 and a z/Architecture in general are disclosed in the following publications: *z/Architecture Principles of Operation*, Seventh Edition (February, 2008); and *z/Architecture Principles of Operation*, Tenth Edition (September 2012). Additional details of a Power ISA™ implementation of system 100 are disclosed in *Power ISA Version* 2.07 (May 10, 2013). Additional Power ISA documents are available via the World Wide Web at www.power.org. The entire disclosure of each of the above-referenced publications is incorporated by reference herein in its entirety.

Two example operations of the disclosed single instruction include the following:

$$RT<=\text{extsw }(RA)<<\text{shift}$$

or:

$$RT<=(RA_{32}{}^{32}\|RA)<<\text{shift}$$

In the first operation, "extsw" sign extends the index and is an abbreviation for "extend sign of the word." "RA" represents the register specified by the RA field of the instruction, and "<<shift" shifts the index by a shift value.

In the second operation shown above, "$RA_{32}$" represents the $32^{nd}$ bit of the RA register, and the superscript 32 replicates the $32^{nd}$ bit of the RA register 32 times. The double bar "∥" is a concatenation operator that means combine the replicated $32^{nd}$ bit with the contents of the RA register, and "<<shift" shifts the index by a shift value.

Another example operation of the disclosed single instruction includes the following:

$$RT<=(RA_{32}{}^{32}\|RA)*UI$$

The above alternative replaces the shift operation with support for aggregate types shown by "*UI", which represents a multiplication (*) by an unsigned immediate field (UI).

Accordingly, the sign extend instruction and the shift instruction of the previously described example instruction sequence may be replaced by a single instruction as follows:
ahi % r2, 1
larl % r1, a
INDEXGF % r2, % r2, 3 (a combined sign extend/shift instruction)
ld % f0, 0(% r2, % r1) (a load instruction)

The single replacement instruction (i.e., the combined sign extend/shift instruction) can be named in a variety of ways. In the above example, the single replacement instruction is INDEXGF. "GF" describes generating a 64-bit result from a 32-bit input, so INDEXGF describes generating a 64-bit index from a 32-bit integer.

In at least one embodiment shown below, an aggregate addressing variant (shown below as <agg>) also requires an offset for a member element within the aggregate. Aggregate data types, also known as complex data structures, are any type of data that can be referenced as a single entity although it includes more than one piece of data. An aggregate data type may be used to keep all related data together in a way that emphasizes the relationships of the data. Examples of aggregate data types are strings, arrays, classes, and structures. Aggregate data types may be used to create higher-level structures that incorporate a more effective use of data, thereby making computer programs less complicated and easier to understand and maintain.

In the following exemplary embodiment, the INDEXGF instruction is used to adjust the index by the size of an aggregate. In one embodiment, the size of the aggregate is a power of 2, and the aggregate size adjustment is specified as a shift count. In another embodiment, the aggregate size is not a power of two, and is specified, for example, as a size with which the index is to be multiplied (e.g., in accordance with an embodiment shown above with respect to multiplying the element index with an element size represented by an unsigned immediate UI, the element size corresponding to an aggregate data type size). The index adjustment may be accomplished by multiplying an element index with an element size. When an element within an aggregate is to be referenced by a memory access after the index has been adjusted by the INDEXGF instruction, a load instruction may be used in conjunction with specifying the element offset within the specified aggregate as an offset from the aggregate address composed of the adjusted index (e.g., register % r2 in the example below) and the array base address (e.g., register % r1 in the example below), e.g., as a displacement directly specified in conjunction with an instruction (such as the ld instruction in the example below):

ahi % r2,1
larl % r1,a
INDEXGF<agg>% r2,% r2,8 (a combined sign extend/shift instruction)
ld % f0,<offset>(% r2,% r1) (a load instruction)

Thus, in effect the single replacement INDEXGF operation sign extends and then shifts. One way to implement INDEXGF would be to classify it is as a shift instruction that takes the 32-bit input, generates a 64-bit input and encode it similar to the way other shift instructions are encoded in a CISC-ISA. A shift-descriptive name, such as "SLLGF" might be provided, and an example of this is provided below:

SLLGF $R_1,R_3,D_2(B_2)$ [RSY-a]

Figure 2:
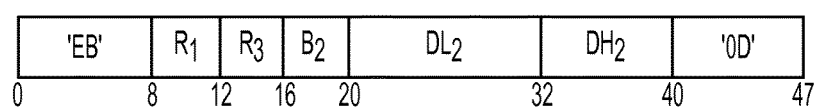
FIG. 2 depicts an example of instruction encoding in a single instruction for performing two adjustments in accordance with one or more embodiments.

FIG. 2 illustrates an example instruction encoding 200 for the single replacement SLLGF instruction shown above. Instruction 200 is encoded as a CISC shift left instruction type. To determine what instruction to perform, a processor reads instruction 200. In CISC architectures, the size of instruction 200 can vary. In the disclosed example, instruction 200 is a 48-bit CISC instruction. The first 8-bits are an operation code, and "EB" in the operation code tells the computer to consult the last 8-bits of instruction 200, which are marked as "0D" from bits 40 to 47 to look for additional specification of the instruction. The combination of EB and 0D together indicate that instruction 200 SLLGF shifts left a 32-bit value by sign extending and shifting it. Thus, the first (EB) and the last (0D) fields together would specify that this is this instruction. $R_1$ specifies the target register, and $R_3$ specifies the index that is to be adjusted. The computer reads the register specified in the $R_3$ field, performs the two adjustments and writes the result to the register number in the register file specified by the $R_1$ field. In the CISC architecture, the shift itself is specified by a value that is encoded as an address, and the encoded address consists of adding to a base register specified by $B_2$ an offset or displacement formed by the concatenation of $DL_2$ and $DH_2$ (with $DH_2$ supplying the high-order bits) for a total of 20 bits. These 20 bits are added to the contents of register $B_2$ and that results in an address. However, in the present disclosure, this result is not used as an address but is instead used in the present disclosure to specify the shift count. The operation of instruction 200 is further illustrated by a methodology 600 shown in FIG. 6 and described in more detail later in this disclosure.

Thus, for the single instruction SLLGF, the 32-bit third operand is sign extended into a 64-bit immediate value. The 64-bit immediate value is shifted left by the number of bits specified by the second-operand address, and the result is placed at the first-operand location. Except when the $R_1$ and $R_3$ fields designate the same register, the third operand remains unchanged in general register $R_3$. The second operand address is not used to address data. The number of rightmost six bits indicates the number of bit positions to be shifted. The remainder of the address is ignored. Depending on design choices, the number of bits may be 3 bits, 6 bits or another number of bits.

More particularly, for the disclosed single instruction, the shift factor is expressed as an address such that an immediate value and a register value are added together but that added-together value, $D_2+B_2$, is then not used to address anything, but just to provide a data type size to use in the adjusting function and the shift function. And that is how historically mainframes have implemented shifts because it enables both the shift-immediate and the shift-register, and even shift-register plus immediate, to be encoded in a single instruction.

Figure 7:
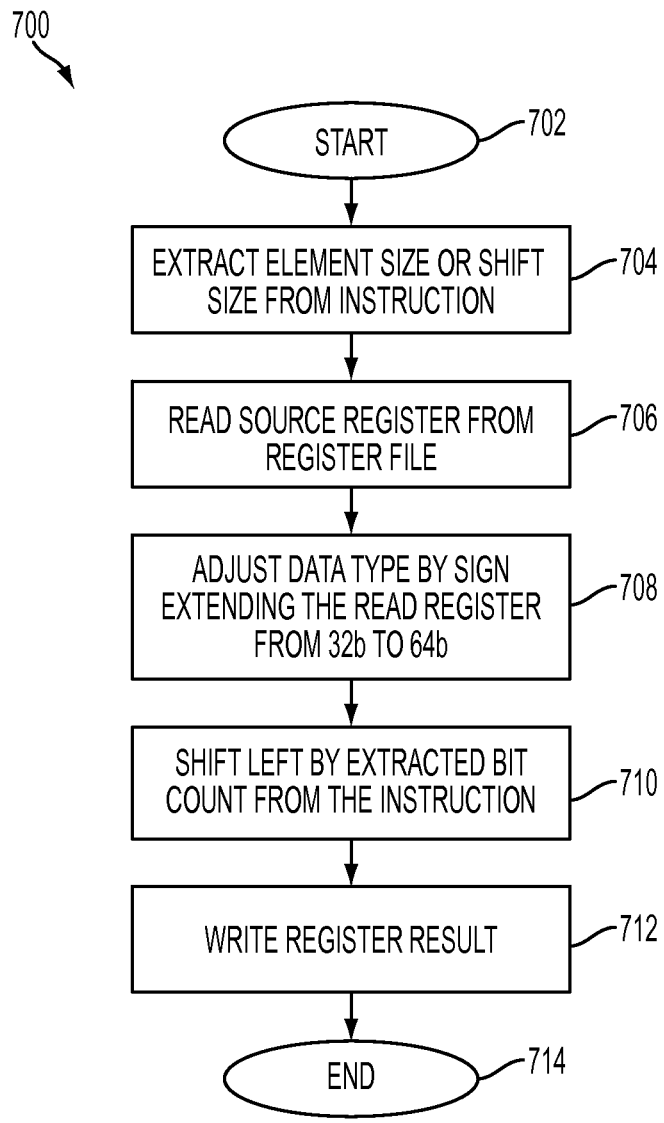
FIG. 7 depicts a flow diagram illustrating another methodology in accordance with one or more embodiments.

An alternative way of implementing the single instruction is as a RISC instruction, examples of which are shown in FIGS. 3-5 and the methodology 700 shown in FIG. 7. Single instruction "indexwa" is a RISC instruction that might either be a D-form or a D5-form. The example shown in FIG. 3 is a D-form. A D-form uses a 16-bit immediate field. Other embodiments are possible where the size of the immediate field might be specified as a 5 bit number (using the D5 instruction format), 3-bits or 8-bits, or any other number.

FIGS. 3, 4 and 5 illustrate additional example embodiments for the single replacement index instruction 300, 400, 500, respectively. All of the instructions shown share the fundamental properties that the index offset computation instruction performs two adjustments. One adjustment that adjusts an index to a size corresponding to the address size. A second adjustment adjusts the index further by the size of the indexed element in an array. Thus, each instruction shown in FIGS. 3, 4 and 5 computes an array index for a 64-bit address space when the index is specified as a signed 32-bit quantity.

In the example shown in FIG. 3, the least significant word of register RA is sign extended by replication of the most significant bit of the low order word, then multiplied with the unsigned integer (UI) specified in the instruction. The least significant word of register RA is sign extended by replication of the most significant bit of the lower order word, then multiplied with the unsigned integer UI specified in the instruction. In one embodiment, a test is performed to count the number of "1" bits that correspond to exactly 1 bit set, indicating that the second adjustment size corresponds to a power of 2. In such an embodiment, an exception (e.g., an illegal instruction indication) may be raised when the number of "1" bits set does not correspond to 1. In one such embodiment, even though a multiplicative count is specified, the multiplication may be implemented by shifting the specified index value by a shift value corresponding to the multiplicative constant and derived therefrom. In another embodiment, no checking of specified constant is performed.

As shown in FIG. 4, the least significant word of register RA is sign extended by replication of the most significant bit of the low order word, then multiplied with the unsigned integer UI specified in the instruction. The least significant word of register RA is sign extended by replication the most significant bit of the lower order word, then shifted left by the shift value.

As shown in FIG. 5, the least significant word of register RA is zero extended inserting a known 0 value in the high order word and conjunction with an unmodified lower order word, and multiplied with the unsigned integer UI specified in the instruction. The least significant word of register RA is zero extended by replication of a 0 bit in conjunction with the lower order word, then multiplied with the unsigned integer UI specified in the instruction. In one embodiment, a test is performed to count the number of "1" bits correspond to exactly 1 bit set, indicating that the second adjustment size corresponds to a power of 2. In such an embodiment, an exception (e.g., an illegal instruction indication) may be raised when the number of "1" bits set does not correspond to 1. In one such embodiment, even though a multiplicative count is specified, the multiplication may be implemented by shifting the specified index value by a shift value corresponding to the multiplicative constant and derived therefrom. In another embodiment, no checking of specified constant is performed.

Although the examples in FIGS. 2-5 are shown with exemplary sets of operation codes and fields, the operation codes and fields should be construed to be exemplary and non-limiting. In particular, other operation codes and fields may be used in conjunction with the teachings contained herein.

Figure 6:
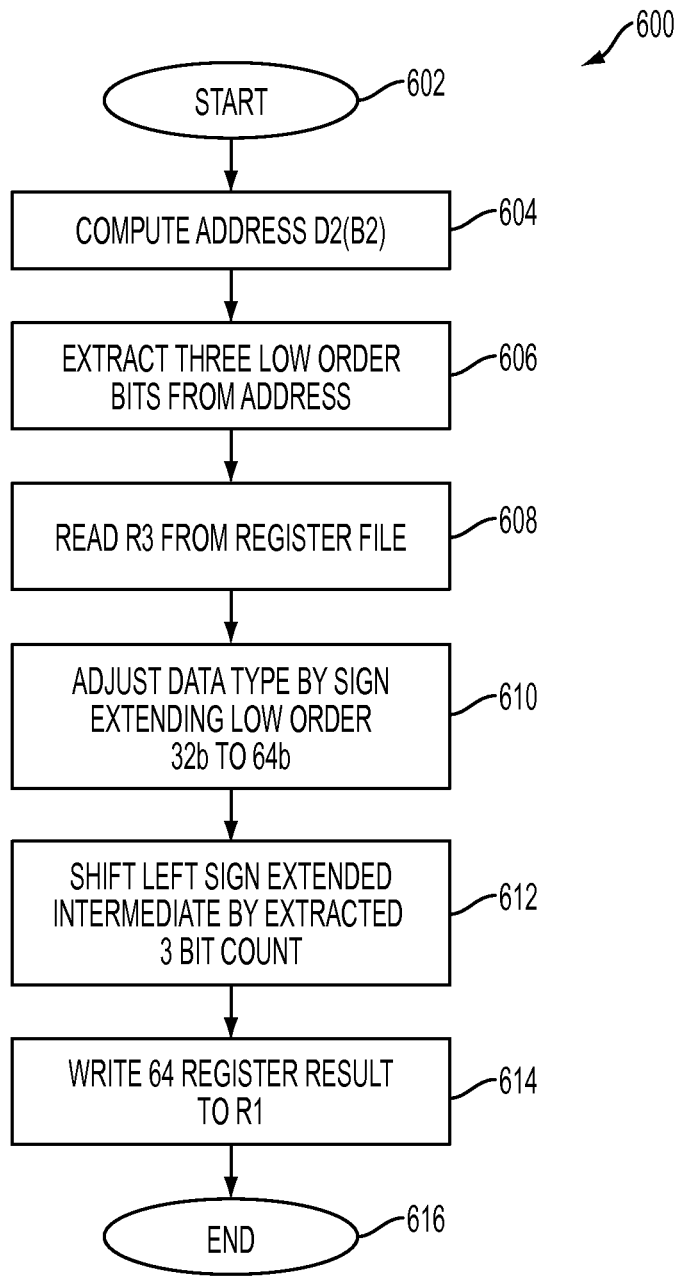
FIG. 6 depicts a flow diagram illustrating a methodology in accordance with one or more embodiments.

FIG. 6 depicts a flow diagram illustrating a methodology 600 in accordance with one or more embodiments (e.g., single instruction SLLGF shown in FIG. 2). Methodology 600 starts at block 602 then moves to block 604 and computes an address $D_2$ ($B_2$), which will be used as the shift count. Block 606 extracts a number of bits from that address, which in this example is 3 bits. Block 608 reads a register $R_3$, which is the index that will be adjusted. Block 610 performs a first adjustment by sign extending a 32-bit index to a 64-bit address. Block 612 performs a second adjustment, which is a shift left to adjust for the size of the indexed element. Block 614 writes the result of the two adjustments to a register, which in this example is specified as $R_1$ by the SLLGF instruction. Methodology 600 ends at block 616.

While methodology 600 describes an exemplary operation of extracting an index from a preferred low-word location as part of step 610, in accordance with an embodiment implementing the present invention in the context of a high-word facility where two 32-bit words may be packed into a single 64-bit register, a high-word SLLGF instruction may obtain an element index from the high order 32 bits of the specified register R3. In accordance with other aspects of a high-word facility embodiment, an implementation of at least one INDEXGF instruction may obtain a shift count to be used from the high order 32 bits of register $B_2$.

FIG. 7 depicts a flow diagram illustrating another methodology 700 in accordance with a RISC embodiment of the present disclosure. Methodology 700 works substantially similar to methodology 600, however, rather than compute an address, the shift would be specified in the unsigned immediate field UI shown in the instruction. Thus, there is no need in methodology 700 to compute an address and extract bits. Instead, the size (i.e., shift value) would be directly extracted from a D field in the instruction. Methodology 700 starts at block 702, then proceeds to block 704 to extract the element or shift size from the instruction. Block 706 reads the source register from the register file. Block 708 adjusts the data type by sign extending the read register from 32-bits to 64-bits. Block 710 shifts left by the bit count extracted from the instruction. Alternatively, block 710 may be implemented as a multiplication of the adjusted value by a specified multiplicand. Block 712 writes the result of the two adjustments to a register. Methodology 700 ends at block 714.

Thus, it can be seen from the forgoing detailed description that technical benefits of the present disclosure include systems and methodologies for providing a single instruction that performs at substantially the same time both adjustments needed in order to complete an array index computation. The disclosed single instruction accesses a 32-bit integer that is an index, sign extends the index to 64-bits, then adjusts the sign extended index by the size of the base element, which is provided as an offset that is used to access an array. Although disclosed in connection with 32-bit indices and 64-bit processor memory locations, the teachings of the present disclosure would apply to any differential between a parameter of the index and a parameter of the array memory. Implementing an array index computation using the disclosed single instruction decreases programming overhead, which has a positive overall impact on application performance, particularly for large data sets. Thus, the functioning of a computer itself may be improved.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for computing and writing a signed array index, the method comprising:
   obtaining, by a computer system, an array index of a first data type;
   wherein said array index comprises a first signed register operand;
   executing, by said computer system, a first single instruction that performs a first adjustment to a size of said first signed register operand;
   wherein said first adjustment corresponds to a size of a second data type;
   wherein said size of said second data type corresponds to a data type size of an address in the computer system;
   wherein said size of said second data type is different from said size of said first signed register operand;
   said first single instruction performing a second adjustment to an immediate operand and using said immediate operand as an offset for obtaining an operand of a third data type size;

writing, by said computer system, a result of said first adjustment and said second adjustment to a result operand register;

wherein said first adjustment and said second adjustment are performed at substantially the same time;

executing, by said computer system, a second single instruction that obtains said result from said result operand register;

obtaining a base register comprising a general purpose address;

obtaining an offset comprising a first base array offset position from said base register added with a second data element offset position within an aggregate element of a data type of a fourth type and size to be accessed within an aggregate element corresponding to a data type of the third type;

wherein said aggregate elements correspond to a position in an array indicated by said first signed register operand;

wherein a data type to be accessed corresponds to a position within said aggregate elements;

wherein said position within said aggregate elements is specified by said second data element offset position; and computing an address by adding said first signed register operand, an operand of said base register and an operand of said offset corresponding to said fourth data type to be accessed.

2. The method of claim 1 wherein said first adjustment comprises a sign extension.

3. The method of claim 1 wherein said second adjustment comprises a shift.

4. The method of claim 1 wherein said second adjustment comprises a multiplication.

5. The method of claim 1 further comprising:

executing, by said computer system, a memory access instruction that obtains said result from said result operand register; and computing a memory address corresponding to a data element in an array;

wherein said data element corresponds to a position in said array indicated by said first signed register operand.

6. The method of claim 1 further comprising:

executing, by said computer system, a memory address computation instruction that obtains said result from said result operand register; and computing a memory address corresponding to a data element in an array;

wherein said data element corresponds to a position in said array indicated by said first signed register operand.

7. The method of claim 1 further comprising executing, by said computer system, a load and store instruction that accesses an operand of said fourth type.

8. The method of claim 1 further comprising executing, by said computer system, a load and store instruction that transfers between a register and a memory an operand of said fourth type.

9. The method of claim 1 further comprising storing said computed address in a register for use as a pointer to an element of said fourth data type.

* * * * *